(12) United States Patent
Edwards et al.

(10) Patent No.: US 8,365,957 B2
(45) Date of Patent: Feb. 5, 2013

(54) METHOD AND APPARATUS FOR A BEVERAGE DISPENSER

(75) Inventors: William A. Edwards, Selma, TX (US); Roger Anthony Kolodziejcyk, San Antonio, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 13/199,210

(22) Filed: Aug. 23, 2011

(65) Prior Publication Data

US 2012/0048866 A1 Mar. 1, 2012

Related U.S. Application Data

(62) Division of application No. 12/154,776, filed on May 27, 2008.

(51) Int. Cl.
*B67D 7/74* (2010.01)
(52) U.S. Cl. .................... 222/129.1; 222/146.6; 62/389; 62/344; 220/592.02
(58) Field of Classification Search ............... 222/146.6, 222/129.1–129.4, 130–131, 183, 389–390, 222/344; 220/592.02, 592.15, 592.16; 62/389–390, 62/344
See application file for complete search history.

(56) References Cited

U.S. PATENT DOCUMENTS

| | | | | |
|---|---|---|---|---|
| 4,555,045 | A | * | 11/1985 | Rodth et al. ..................... 222/1 |
| 5,249,710 | A | * | 10/1993 | Hassell et al. ............. 222/146.6 |
| 5,343,716 | A | * | 9/1994 | Swanson et al. ................ 62/389 |
| 5,350,086 | A | * | 9/1994 | Martin et al. ............. 222/146.6 |
| 5,397,032 | A | * | 3/1995 | Landers ..................... 222/146.6 |
| 5,433,348 | A | * | 7/1995 | Deering et al. ............ 222/129.1 |
| 5,542,572 | A | * | 8/1996 | Davis ........................... 222/108 |
| 5,996,842 | A | * | 12/1999 | Riley et al. ........................ 222/1 |
| 6,505,758 | B2 | * | 1/2003 | Black et al. ................ 222/146.6 |
| 6,698,229 | B2 | * | 3/2004 | Renken et al. ................. 62/390 |
| 8,074,842 | B2 | * | 12/2011 | Edwards et al. ........... 222/129.1 |

* cited by examiner

*Primary Examiner* — Frederick C. Nicolas
(74) *Attorney, Agent, or Firm* — Christopher L. Makay (57) ABSTRACT

A product dispenser reconfigurable in the field includes a housing, at least one tower unit, and a removable ambient box. The at least one tower unit includes at least one dispense point, whereby a product or diluent is delivered from a diluent or product source to the dispense point. The ambient box is an insulated product path that is adaptable to at least one external source and the tower units or the dispense points. The external source may be conditioned externally or may deliver an ambient temperature product, wherein the product circuits passing through the ambient box may deliver product to any tower unit, thereby providing increased product variability within a same product dispenser. The product dispenser still further includes a tower structure that is removable without disabling the product circuits, and a method of merchandising on the tower structure.

3 Claims, 8 Drawing Sheets

Fig. 2h

METHOD AND APPARATUS FOR A BEVERAGE DISPENSER

CROSS-REFERENCE TO RELATED APPLICATION

This application is a divisional of patent application Ser. No. 12/154,776, which was filed May 27, 2008.

BACKGROUND OF THE INVENTION

1. Field of the Invention

The present invention relates to product dispensing equipment and, more particularly, but not by way of limitation, to methods and an apparatus for providing modular components in a beverage dispensing tower.

2. Description of the Related Art

Product dispensers in the beverage dispensing industry typically are hard plumbed, and have a life expectancy of approximately seven years. However, the product side of the product dispensing market changes rapidly, as food product manufacturers continuously create products aimed to capture a particular group of customers. Illustratively, beverage dispensing trends have moved from predominantly carbonated beverages to non-carbonated beverages in both conditioned and unconditioned forms, including waters, flavored waters, teas, juices, and the like. As such, retail account owners often find themselves with a product dispenser that is incapable of delivering newly popular products.

Problems arise when retail account owners desire to change their product availability. If the product dispenser is minimally upgradeable, it may not accommodate the newly desired product list. While multiple tower units provide some flexibility to remove and replace a portion of the product dispenser, the balance of the housing is typically hard plumbed, and there is no means for delivering ambient products. The problems are compounded when the beverage dispenser must be removed from a dispensing location to be retrofit, thereby forcing the establishment to lose sales and customers while the product dispenser is being retrofit.

Accordingly, a product dispenser that is reconfigurable in the field would be beneficial to product dispenser owners, product consumers, as well as product dispenser manufacturers.

SUMMARY OF THE INVENTION

In accordance with the present invention, a product dispenser includes the ability to be reconfigured in the field. The product dispenser includes a housing, at least one tower unit, and an ambient box that is removable. The at least one tower unit includes at least one dispense point, whereby a product or diluent is delivered from a diluent or product source to the dispense point. The ambient box is a reconfigurable insulated product path that is adaptable to at least one external source. The at least one external source may be conditioned through external means or may be an ambient temperature product. The product circuits passing through the ambient box may deliver product to any tower unit, thereby providing increased product variability within a same product dispenser.

The product dispenser further includes a storage chamber having a redirector for keeping the product from being scooped out of a rear portion of the storage chamber. The product dispenser further includes a rotating lid on an inlet of the storage chamber, and a conversion to a sliding lid having a valve cutout switch, thereby disabling the product valves when the sliding lid is in an open position. The product dispenser still further includes a tower structure that is removable without disabling the product circuits, and a method of merchandising on the tower structure.

It is therefore an object of the present invention to provide a product dispenser including an ambient box that is reconfigurable.

It is a further object of the present invention to provide a product redirector disposed within the storage chamber of the product dispenser.

It is still further an object of the present invention to provide a method of merchandising on the tower structure.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

In a simplest embodiment, a product dispenser 100 includes housing 101 having a lower unit 110, at least two dispensing tower units, and a tower structure 125. The product dispenser 100 utilizes at least one product circuit 201 to dispense products, beverages, soups, teas, and the like. The product dispenser 100 may further include a second product circuit 202, and a diluent circuit 103 for mixing with concentrates. In this specific example, the product dispenser 100 is capable of delivering a reconstituted product, carbonated water, and uncarbonated water in both conditioned and unconditioned forms. As shown in FIGS. 1a-1d, the product dispenser 100 includes a first tower unit 121, a second tower unit 122, a third tower unit 123, the tower structure 125, the lower unit 110, dispensing valves, a drip tray, and a cup rest. In this first embodiment, the product dispenser 100 is a drop-in product dispenser, wherein the product dispenser 100 hangs from a counter at a point of use. The product dispenser 100 further includes a storage chamber 126 and a fluid conditioning system for chilling diluents and concentrates for consumption. The storage chamber 126 and the conditioning system are disposed beneath the counter. The tower units 121-123 are disposed above the counter, and support at least one dispense point 105 utilized for regulating the flows of products, mixing the diluent with the products, and delivering a reconstituted or a single-strength product.

Figure 1A:
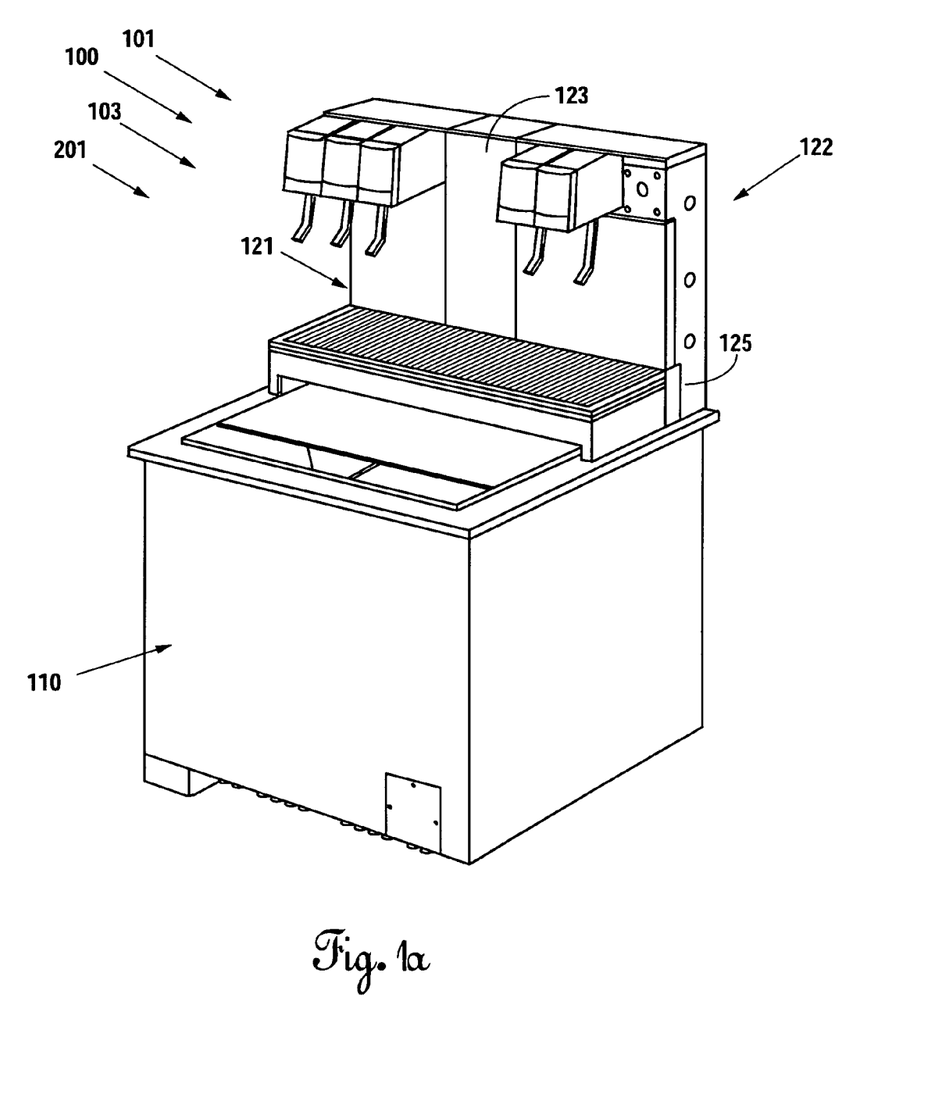
FIG. 1*a* provides a perspective view of a product dispenser according to the preferred embodiment.
Figure 1B:
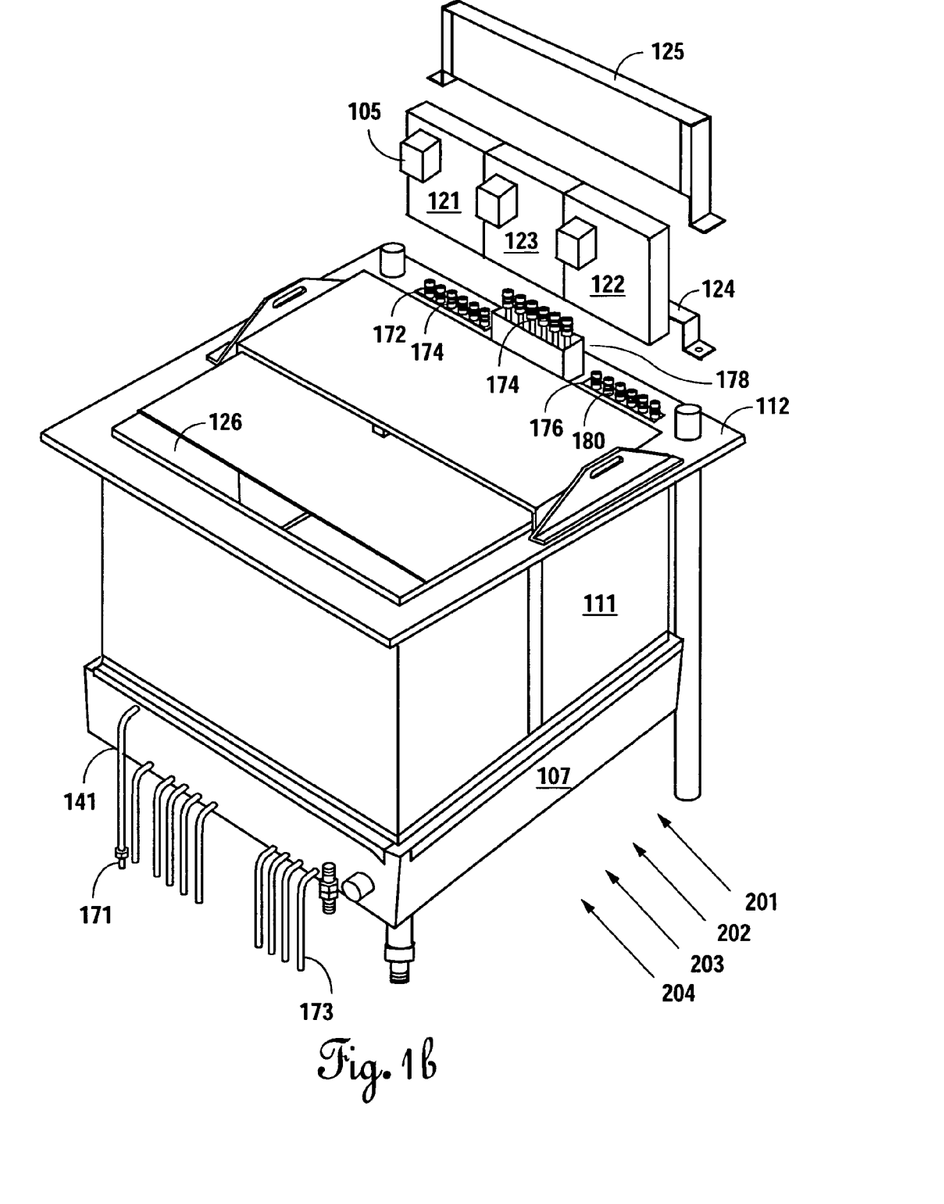
FIG. 1*b* provides a partially exploded view of the product dispenser according to the preferred embodiment.
Figure 1C:
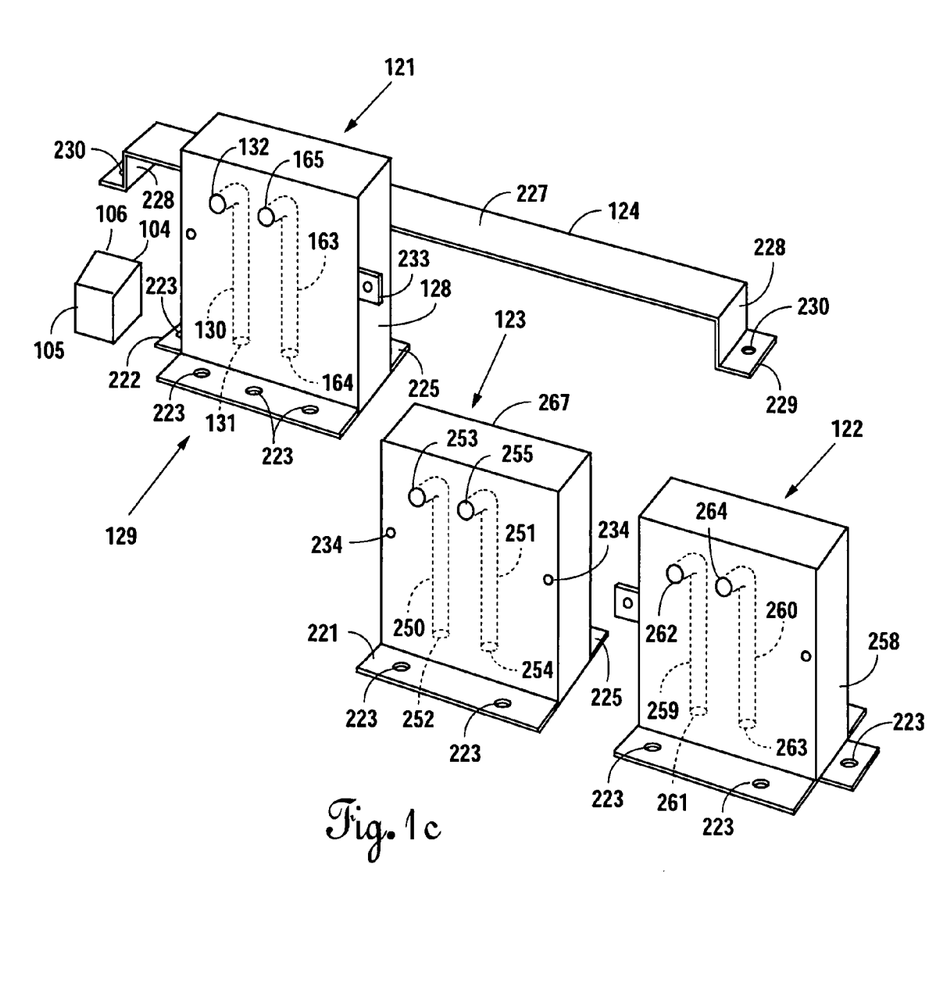
FIG. 1*c* provides details views of the tower units according to the preferred embodiment.

The first tower unit 121 is similar in form and function to a first tower unit disclosed in U.S. patent application Ser. No. 11/801,125 filed on May 8, 2007, which is hereby incorporated by reference. The first tower unit 121 includes at least one product line 130 disposed within a first tower shell 128, as shown in FIG. 1c. The first tower shell 128 is filled with an insulation 129 to insulate the product line 130, and to provide support to all product lines 130 disposed within the shell 128. The product line 130 includes an inlet 131 that mates with an outlet 174 of a first lower product circuit 203 of the lower unit 110, and an outlet 132 that mates with an inlet 106 of the dispense point 105, thereby extending the first lower product circuit 203 to the dispense point 105. One of ordinary skill in the art will recognize that the tower units 121-123 may include multiple product lines 130 for the delivery of additional products. In this specific example, the first tower unit 121 further includes at least one diluent line 163 having an inlet 164 and an outlet 165, wherein the inlet 164 couples with a first outlet 172 of the diluent circuit 103 of the lower unit 110, and the outlet 165 couples with a diluent inlet 104 of the dispense point 105.

The shell 128 further includes at least one mounting flange 221 disposed on a side nearest a front of the product dispenser 100. The mounting flange 221 includes apertures 223 at a spacing complementary to restraint apertures 224 disposed in a top plate 112 of the lower unit 110. If the tower unit is disposed on an end of the row of tower units, a second mounting flange 222 is utilized. The second mounting flange 222 includes an aperture 223 in alignment with a restraint aperture 224 disposed in the top plate 112. The shell 128 further includes a rear flange 225 disposed opposite of the mounting flange 221. The flanges 221, 222, and 225 extend outward from the shell 128. In this particular example, the shell 128 is formed from sheet metal, and is of a gage suitable for structural restraint.

The second tower unit 122 is substantially identical to the first tower unit 121, and includes a second product line 260, and a second diluent line 259. The second product line 260 includes an inlet 263 and an outlet 264, and the second diluent line includes an inlet 261 and an outlet 262. In this particular example, the inlet 263 of the second product line 260 mates with an outlet of a second lower product circuit 204, and the outlet 264 mates with an inlet 106 of the dispense point 105. The inlet 261 of the second diluent line 259 mates with a second outlet 180 of the diluent circuit 103. While the first and second tower units 121-122 have been shown as being substantially identical in this embodiment, one of ordinary skill in the art will recognize that the first tower unit 121 and the second tower unit 122 may include a different number of product lines 130 and diluent lines 163, as well as a different number of dispense points 105, a different arrangement of product lines, and the like, dependent upon site specific requirements and customer preferences.

The second tower unit 122 further includes a second shell 258, wherein the second shell 258 is filled with insulation, in similar fashion to the first tower unit 121.

The third tower unit 123 is similar in form and function to the first and second tower units 121-122, and includes a shell 267 housing a first ambient product line 250, a second ambient product line 251, and an insulation disposed between the shell 267 and the ambient product lines 250-251. The first ambient product line 250 includes an inlet 252 and an outlet 253, and the second ambient product line 251 includes an inlet 254 and an outlet 255. The shell 267 further includes a mounting flange 221 including restraint apertures 223, and a rear flange 225. The shell 267 further includes securing apertures 234 for connection to adjacent tower units. One of ordinary skill in the art will recognize that the third tower unit 123 may include multiple product lines disposed in varying arrangements for mating with outlets of the lower unit 110.

The product dispenser 100 further includes a back support bracket 124 to provide additional support to the tower units 121-123. The back support bracket 124 includes a planar portion 227, perpendicular legs 228 disposed at each end, and flanges 229 extending from the legs 228. The flanges 229 further include apertures 230 for securing the back support bracket 124 in place. In this particular example, the legs 228 are disposed at a spacing complementary to the width of the tower units 121-123 when disposed adjacent to each other, such that the legs 228 captivate the tower units 121-123, and the apertures 230 are aligned with the apertures 223 of the second mounting flanges 222.

Figure 1D:
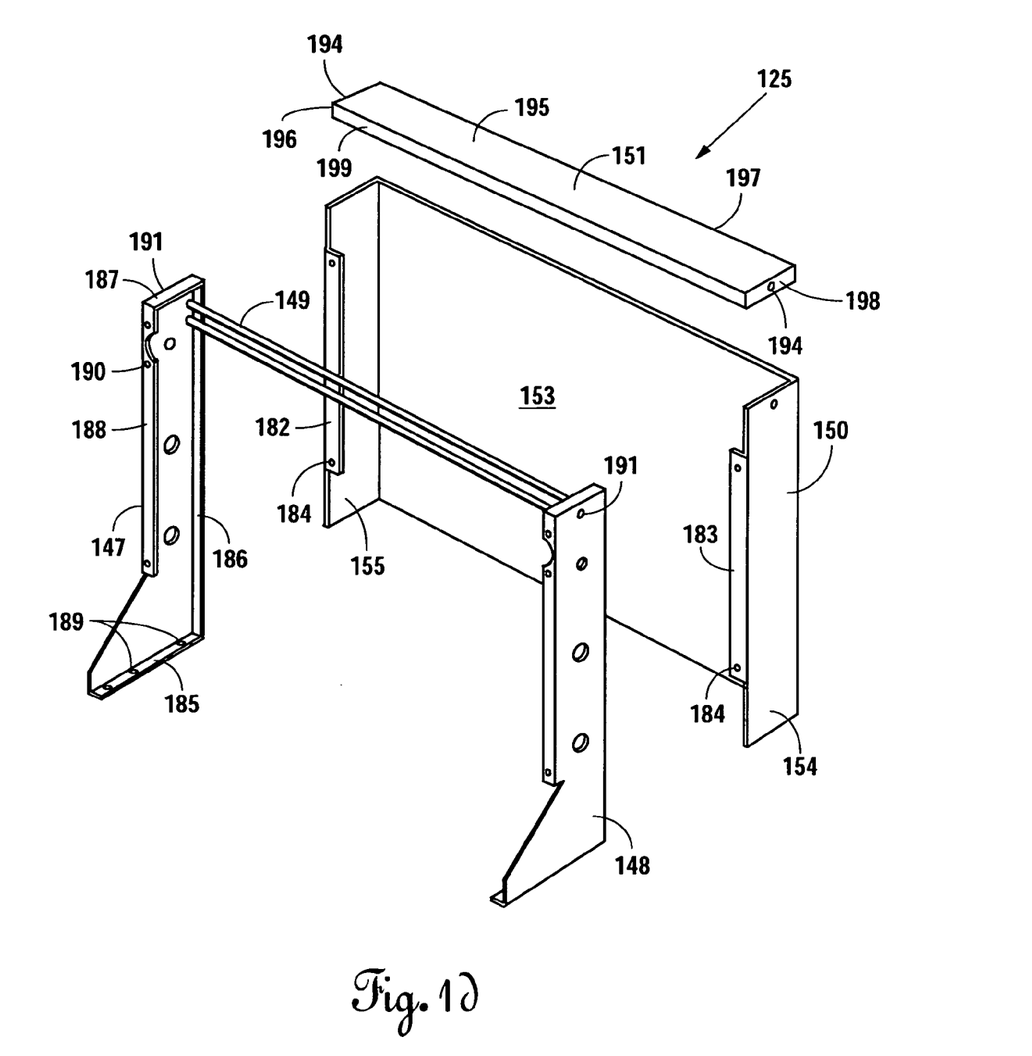
FIG. 1*d* provides an exploded view of a tower structure according to the preferred embodiment.

The tower structure 125 includes a first vertical support 147, a second vertical support 148, a crossbar 149, an outer skin 150, and a cap 151. As shown in FIG. 1d, the first and second vertical supports 147-148 are substantially symmetrical, and therefore only one will be described. The vertical supports 147-148 may be formed from any material having sufficient strength and rigidity. In this particular example, the first and second vertical supports 147-148 are formed from steel sheets. Alternatively, the vertical supports 147-148 may be formed from stainless steel, or a resin. The first vertical support 147 is planar in shape and includes first through fourth flanges 185-188 for stiffness. The first flange 185 includes apertures 189 to aid in securing the vertical support 147 to the lower unit 110, and the fourth flange 188 includes apertures 190 for receiving fasteners that secure the outer skin 150 to the first and second vertical supports 147-148. The crossbar 149 is disposed between the first and second vertical supports 147-148 to provide support between the vertical supports 147-148. The crossbar 149 is formed from a steel, and is rigidly secured to the first and second vertical supports 147-148 utilizing fasteners or welding. The crossbar 149 includes a cross-section having increased inertial properties, such as a channel or other extrusion.

The outer skin 150 is formed from a stainless steel sheet, and includes a planar surface 153, a first side panel 154, and a second side panel 155. The planar surface 153 is of a size complementary to the distance between the outer surfaces of the vertical supports 148-149, such that the side panels 154-155 extend around the first and second vertical supports 148-149 when the outer skin 150 is installed, thereby closing out a rear portion of the product dispenser 100. In this particular example, the first side panel 154 includes a flange 183 disposed substantially perpendicular to the first side panel 154, and the second side panel 155 includes a flange 182 disposed substantially perpendicular to the second side panel 155. The flanges 182-183 further include apertures 184 for securing the outer skin 150 to the vertical supports 147-148. The cap 151 is similarly formed from stainless steel sheet, and includes a planar section 195 and first through fourth flanges 196-199 extending in a same direction. The first flange 196 and the third flange 198 include apertures 194 for securing the cap 151 to the vertical supports 147-148. The planar section 195 is of a size complementary to an area disposed between the first and second vertical supports 147-148, and secures to the vertical supports 147-148 with fasteners, thereby closing out a topmost portion of the tower structure 125.

Figure 2A:
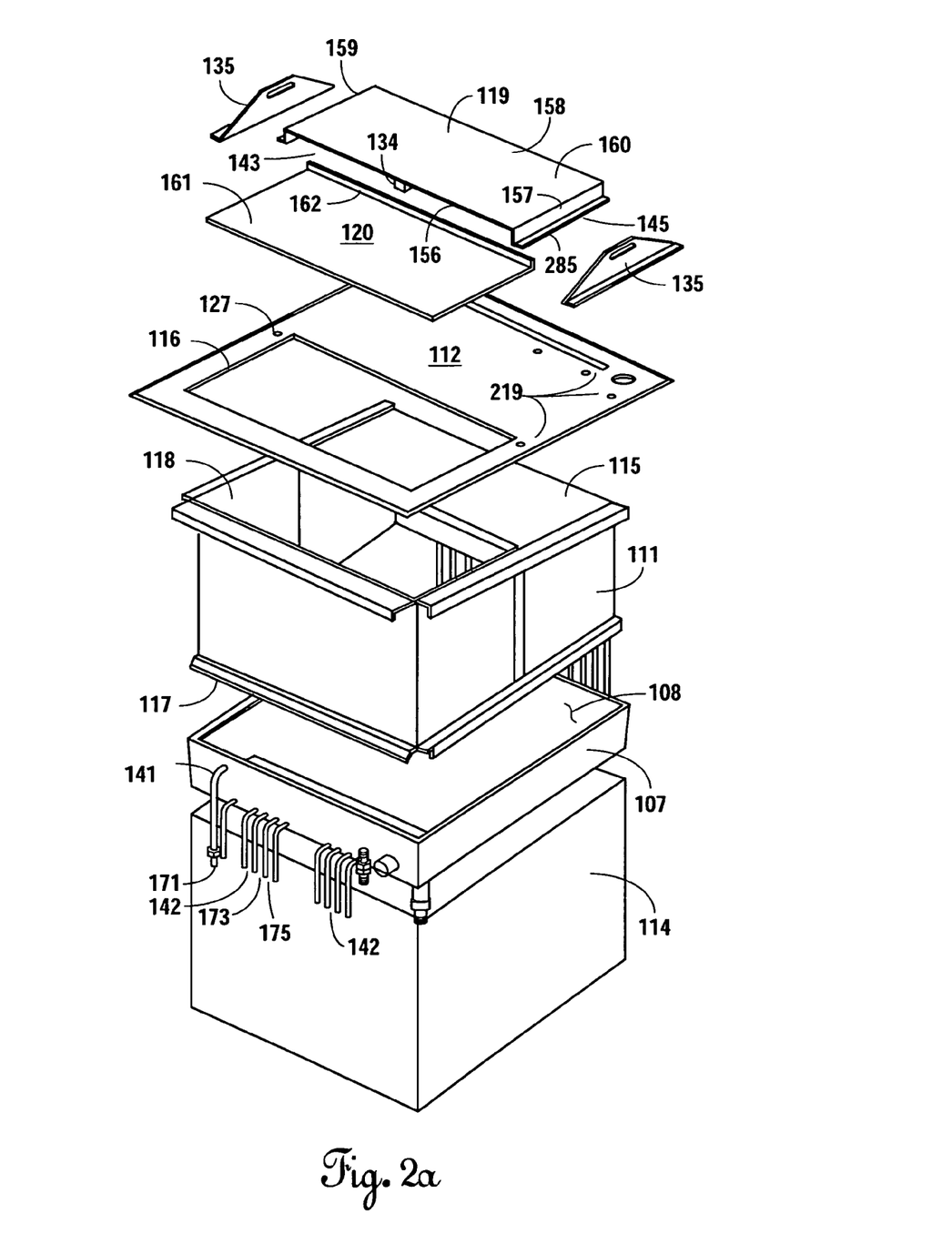
FIG. 2*a* provides an exploded view of the lower unit according to the preferred embodiment.
Figure 2B:
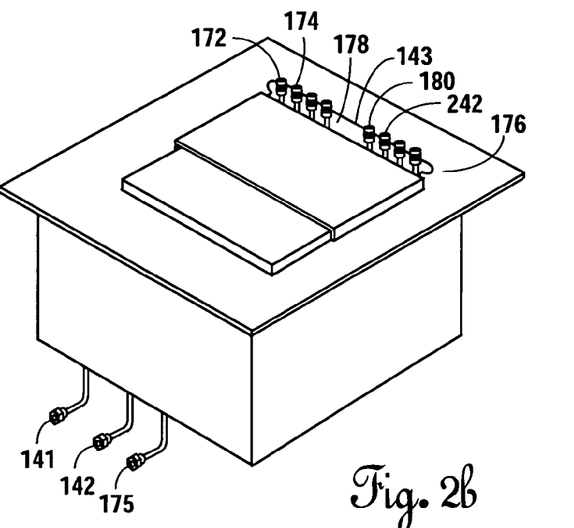
FIG. 2*b* provides a perspective view of the lower unit wherein the outlets of the product lines are disposed in a bank according to the preferred embodiment.

The lower unit 110 comprises a cold plate 107, a bin 111 disposed on the cold plate 107, the top plate 112, and an insulated wrapper 114. The cold plate 107 is of the type commonly utilized in the beverage dispensing industry, whereby product and diluent circuits pass through the cold plate 107 for conditioning. In this specific example the diluent line 141 and the first and second product lines 142 and 175 extend from a front of the cold plate 107, make multiple passes through the cold plate 107, and then exit the cold plate 107 through a rear face. The product and diluent lines 141-142 and 175 then extend upward, such that the outlets 172, 174, 180, and 242 pass through a product line aperture 143 of the top plate 112. In this particular example, outlets for the product and diluent lines 141, 142, and 175 are disposed in a first bank 176, as shown in FIG. 2b. The first bank 176 of outlets is substantially evenly spaced, and includes a gap 178 in the sequence. The gap 178 is substantially central to the product line aperture 143. The product and diluent lines 141, 142, 175 may further include hardware suitable for connection to mating components disposed within the tower units 121-123, as well as those required for connection to a diluent source and an appropriate number of concentrate sources. The cold plate 107 may further include an upper surface 108 upon which ice is stored, thereby chilling the cold plate 107 and the product and diluent lines 141,142, and 175 passing through the cold plate 107.

Figure 2C:
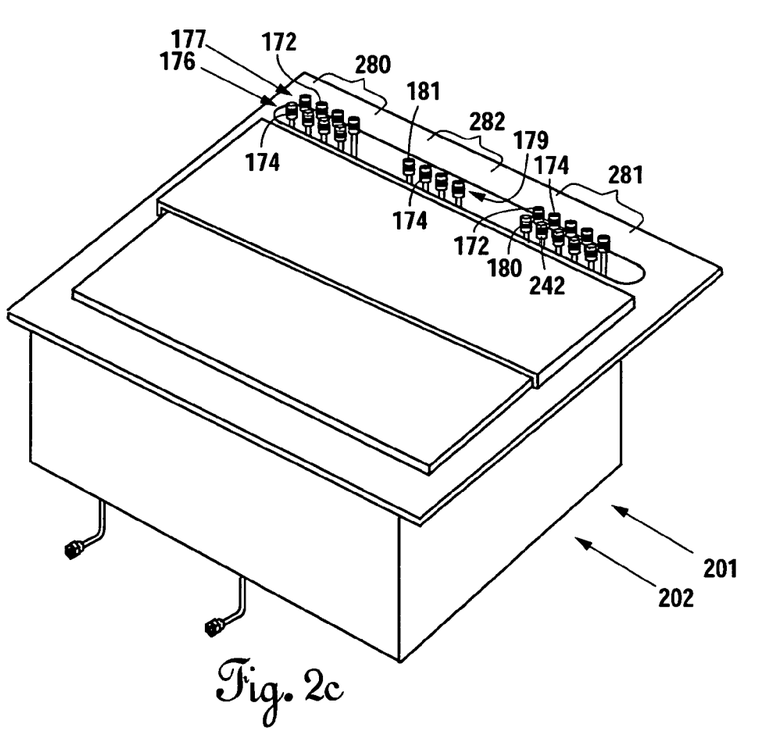
FIG. 2*c* provides a perspective view of the lower unit wherein the outlets are disposed in arrays according to an alternative embodiment.

Alternatively, the product and diluent line outlets 172, 174, 180, and 242 may be disposed in arrays complementary to a respective tower unit. In the arrays arrangement, the lower unit 110 could include multiple banks of product line outlets disposed in multiple arrays. As shown in FIG. 2c, the product dispenser 100 includes a first bank 176 and a second bank 177. The first and second banks are then divided into arrays. A first array 280 includes a portion of the first bank 176 and a portion of the second bank 177, a second array 281 includes a portion of the first bank 176 and a portion of the second bank 177, and a central array 282 includes a portion of the first bank 176. With the central array 282 having only a first bank 176, a gap 179 is created in the second bank 177. While the central array 282 has been shown with only one bank of outlets 172 or 174, one of ordinary skill in the art will recognize that the use of an array with only one bank is not limited to the central array 282, as any of the tower units could still contain a full complement of product circuits, or could include a partial set of product lines to complement the partial array disposed on the lower unit 110. Still further, the gap 179 for the second bank 177 may be disposed over a single array, multiple arrays, or the entire second bank 177 may be removed to provide the ability to add additional product sources.

In this particular example having three arrays, the arrangement of the outlets disposed in the first array 280 is not restricted, as both product and diluent lines may be disposed in either the first or second banks 176-177. Similarly, the outlets disposed in the second array 281 may also be placed in either bank 176 or 177. In the central array 282, the third diluent outlet 181 must be disposed in the first bank 176 to maintain clearance for an ambient box 169.

Figure 2D:
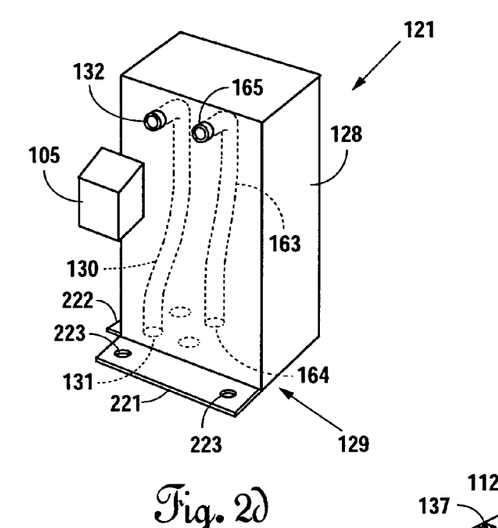
FIG. 2*d* provides a perspective view of a tower unit with a complementary array layout according to the alternative embodiment.

In the arrays arrangement, as shown in FIG. 2d, a first tower unit 121 product line 130 and diluent line 163 are disposed in a first bank 176 and a second bank 177, whereby the inlets 131 and 164 are disposed in a location complementary to the outlets of the first array 280 of the lower unit 110. The product and diluent lines 130 and 163 further include outlets 132 and 165 for mating with the dispense point 105. One of ordinary skill in the art will recognize that product and diluent lines 130 and 163 are disposed in a location that allows the first and second lower product circuits 203-204, and the diluent circuit 103 of the lower unit 110 to be extended when a tower unit is installed onto the lower unit 110. Should an array 280-282 include fewer outlets than a mating tower unit, the unconnected product and diluent lines in the tower unit are available for use if connected to a product or diluent supply.

In this specific example of a product dispenser including arrays, the second tower unit 122 is of a similar construction to the first tower unit 121, whereby the product and diluent lines may be disposed in either bank.

The third tower unit 123 must include diluent and product lines in locations complementary to the outlets disposed in the central array 282. Illustratively, in this specific example, the third tower unit 123 includes a diluent product line disposed in the first bank 176 and at least one ambient product line 250 or 251 disposed in the second bank 177. Accordingly, the third tower unit 123 receives diluent from the diluent source.

The bin 111 includes four lateral walls disposed at a spacing complementary to the upper surface 108 of the cold plate 107. The walls extend from the cold plate 107 to the top plate 112, thereby forming a storage chamber 126 having a lower port 117 and an inlet 118. The bin 111 may be of any suitable construction, such that it does not contaminate a product disposed within the storage chamber 126. In this first embodiment, the bin 111 is constructed from a stainless steel. The bin 111 further includes a redirector 115 disposed over approximately half of the inlet 118 nearest to the rear face of the cold plate, such that the redirector 115 closes out a rear portion of the inlet 118. In this embodiment the redirector 115 is of a same construction as the bin 111, and may be secured utilizing any suitable form of attachment, including welding, fasteners, and the like. The bin 111 further includes flanges having apertures, wherein fasteners pass through the apertures and secure the bin 111 to the cold plate 107.

The top plate 112 is substantially planar in form, and is of a size slightly larger than a cross-section of the bin 111. The top plate 112 includes a chamber port 116 of a size complementary to the open portion of the inlet 118 of the bin 111, and at least one product line aperture 143 that allows the passage of the concentrate and diluent lines through the top plate 112. The top plate 112 further includes restraint apertures 127 for receiving fasteners. The top plate 112 may be secured to the bin utilizing any method, including fasteners, welding, or the like.

Figure 2E:
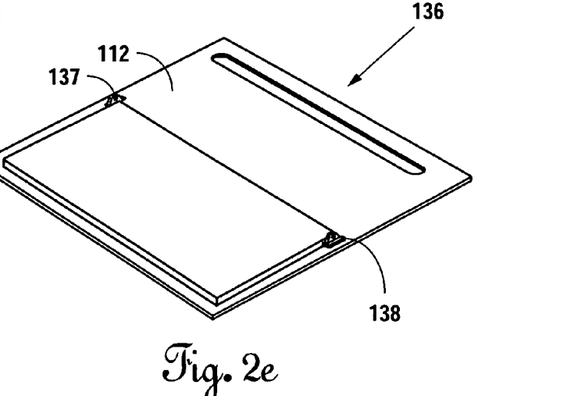
FIG. 2*e* provides a perspective view of a top plate including a rotating lid according to a second alternative embodiment.
Figure 2F:
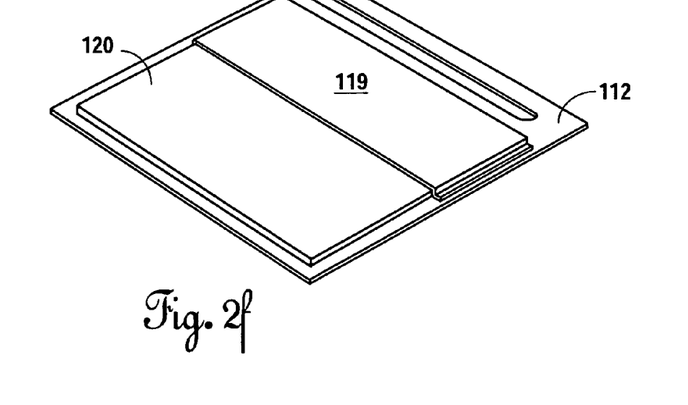
FIG. 2*f* provides a perspective view of a top plate including a sliding lid assembly according to a third alternative embodiment.

The lower unit 110 further includes a lid 120 and a lid housing 119. The lid housing 119 includes a planar face 160 and first through third flanges 157-159. The first through third flanges 157-159 are attached to mounting flanges having apertures 285 for securing to the top plate 112. The first through third flanges 157-159 create a cavity 145 beneath the lid housing 113 when the lid housing 113 is installed onto the top plate 112. A fourth flange 156 extends downward from the planar face 160 to create a stop, and includes a valve cutout switch 134. In this embodiment, the lid housing 119 is formed from stainless steel, and is secured to the top plate 112 with fasteners passing through the restraint aperture 127 of the top plate 112. The lid 120 is of a size complementary to the cavity 145 of the lid housing 119 and the chamber port 116. The lid 120 is substantially planar in shape, and includes a planar face 161 and a flange 162 extending away from the bin 111 for engaging the valve cutout switch 134.

Alternatively, the product dispenser 100 may include a rotating lid 136 having a hinge pin 138 disposed in hinge brackets 137. The rotating lid 136 is of similar construction to the sliding lid 120, however the rotating lid 136 includes a flange disposed around the hinge pin 138, whereby the lid 136 rotates about the hinge pin 138. The hinge brackets 137 are similarly formed from sheet metal, and include an aperture of a size complementary to the hinge pin 138. The hinge brackets 137 are secured with fasteners to the restraint apertures 127 of the top plate 112 in similar fashion to the sliding lid 120. Accordingly, the sliding lid 120 and the rotating lid 136 are, with accompanying hardware, interchangeable.

Figure 2G:
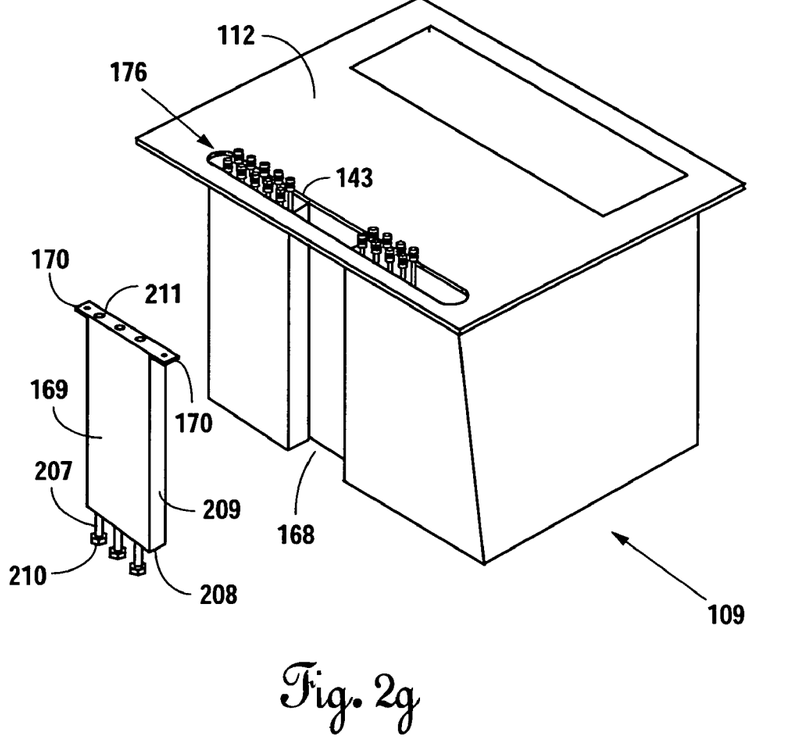
FIG. 2*g* provides an exploded view of the lower unit including an ambient box according to the preferred embodiment.

The lower unit 110 includes an insulated wrapper 114 disposed around the bin 111 and the cold plate 107. One of ordinary skill in the art will recognize that a sheet metal wrapper may be formed and then any voids between the bin 111 and the wrapper 114 may be filled with an expanding foam, thereby insulating the product and diluent circuits 201, 202, and 103, as well as securing the product and diluent lines of the lower product circuits 203, 204, and 103 in place. The lower unit 110 further includes an ambient cutout 168. The ambient cutout 168 is a recessed area in the wrapper 114, and a complementary gap in the insulation that allows passage of product lines disposed within an ambient box 169 to pass from outside of the wrapper 114, and through the product line aperture 143 of the top plate 112. Accordingly, product is delivered from an alternate source to the top plate 112. In this particular example, the ambient cutout 168 extends from the top plate 112 downward through the lower unit 110, and passes through a central portion of the first bank 176.

The ambient box 169 includes at least one ambient product line 207, an ambient wrapper 209 disposed about the at least one ambient product line 207, and an insulation 208 disposed between the at least one ambient product line 207 and the ambient wrapper 209. The ambient wrapper 209 further includes securing flanges 170 disposed at an uppermost position, such that the upper end of the ambient box 169 may be secured to the tower units 121-122. The securing flanges 170 include apertures for receiving fasteners. The securing flanges 170 may be directed horizontally or vertically to adapt to adjacent hardware. The at least one ambient product line 207 includes an inlet 210 and an outlet 211 that extend beyond the ambient wrapper 209, and include connections complementary to the inlets of the to the tower units 121-123, or other connection forms, including barb fittings, dole fittings, o-ring connections, and the like. The inlet 210 is suitable for connection to an ambient source, such as concentrate to be served at ambient temperatures, a diluent required at ambient temperatures, or a full strength product to be served at ambient temperatures. One of ordinary skill in the art will recognize that multiple ambient product lines may be disposed within the ambient box 169, and be connected to independent ambient sources. One of ordinary skill in the art will further recognize that the size of the ambient cutout 168 is not limited to an ambient box 169 having a single ambient product line 207, as the ambient box 169 may be adjusted to accommodate a multitude of ambient product lines 207, and the ambient cutout 168 may be adjusted to complement the ambient box 169. Illustratively, the ambient box 169 may include product lines 207 disposed in different arrays, or disposed in different banks. One of ordinary skill in the art will recognize that the outlets 172, 174 and 211 must be at least partially complementary to the inlets 131 of the tower units. Accordingly, ambient products or ambient diluents passing through the ambient box 169 may be delivered to virtually any tower unit 121-123 disposed atop the top plate 112.

The product dispenser 100 may further include a controller 133. The controller 133 may be any form of processing device suitable for controlling and processing signals, including microcontrollers, processors, and the like.

Figure 2H:
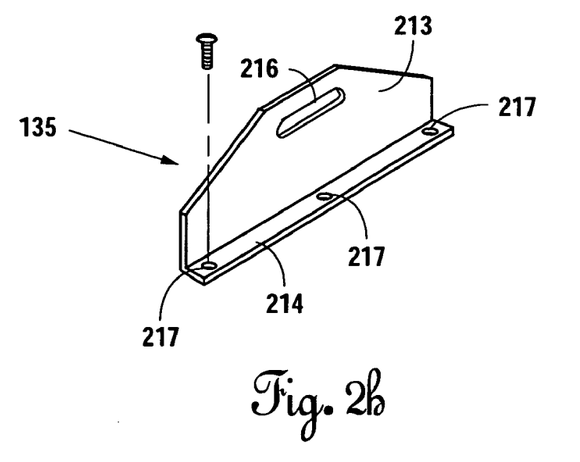
FIG. 2*h* provides a perspective view of a lifting tang according to an alternative embodiment.

The product dispenser 100 may further include lifting tangs 135 for attaching connection points of a lifting device. The lifting tangs 135 are disposed on opposite sides of the product dispenser 100 to provide balanced lifting. In this embodiment, the lifting tangs 135 are formed from a structural sheet metal, such as stainless steel. As shown in FIG. 2h, the lifting tangs 135 include a securing flange 214 and a lifting flange 213. The lifting flange 213 includes at least one lifting port 216, and the securing flange 214 includes securing apertures 217 for accepting fasteners. The securing apertures 217 are disposed at a spacing complementary to restraint apertures 219 disposed in the top plate 112.

On assembly, the redirector 115 is secured to the bin 111 over a portion of the inlet 118 disposed nearest the rear of the cold plate 107, such that the inlet 118 is open nearest the front of the bin 111. In this particular example, the redirector 115 is spot welded to the bin 111. While this redirector 115 has been shown as being spot-welded to the bin 111, one of ordinary skill in the art will recognize that virtually any form of securing is possible. Next, the lower port 117 of the bin 111 is secured to the cold plate 107, such that the inlet 118 is disposed nearest the front of the bin 111. In this preferred embodiment, the bin 111 is secured to the cold plate 107 utilizing fasteners passing through the apertures in the flanges.

Once the bin 111 has been secured to the cold plate 107, the top plate 112 is secured to the inlet 118 of the bin 111, such that the chamber port 116 is in alignment with the uncovered portion of the inlet 118. In this particular example the top plate 112 is screwed to the bin 111. While the top plate 112 has been shown with fasteners, one of ordinary skill in the art will recognize that other forms of securing are possible, including welding, rivets, and the like. The outlets 172, 174, 180, and 242 pass through the product line aperture 143 when the top plate 112 is in the installed position.

The partially assembled unit may then be placed in the foaming jig to form the insulation around the partially assembled unit. Upon curing, the foamed, partially assembled unit is placed into the wrapper 114, and secured to the wrapper 114 utilizing any suitable means. Accordingly, the insulation fills any voids between the bin 111 and the wrapper 114, thereby providing insulatory properties to the contents of the bin 111.

The lid 120 may then be aligned with the lid housing 119, such that the flange 162 faces toward the lid housing 119, and is disposed within the cavity 145. The lid housing 119, including the valve cutout switch 134, may then be secured with fasteners to the restraint apertures 127 of the top plate 112, thereby captivating the flange 162 within the cavity 145 of the lid housing 119.

Alternatively, a product dispenser 100 utilizing a rotating lid 136 may include the steps of securing the rotating lid 136 to a hinge pin 138, securing one hinge bracket 137 to the top plate 112, inserting one end of the hinge pin 138 into the aperture of the installed hinge bracket 137, inserting the free end of the hinge pin 138 into the aperture of the uninstalled hinge bracket 137, and securing the uninstalled hinge bracket 137 to the top plate 112. In this fashion, the rotating lid 136 is secured in place, and is free to rotate about the hinge pin 138.

The assembly continues with the insertion of the ambient box 169 into the gap 178, the product line aperture 143, and the ambient cutout 168 of the lower unit 110. The end including the inlets 210 is inserted through the gap 178 disposed between the outlets leading to the first and second tower units 121-122. Illustratively, the gap 178 is aligned with the ambient cutout 168. As such, the ambient box 16 moves downward until the securing flanges 170 bottom out on the top plate 112. In this fashion, the outlets 211 of the ambient box 169 are in alignment with the outlets 172, 174, 180, and 242 of the lower unit 110, thereby completing the first bank 176.

In a multiple bank arrangement, the installation of the ambient box 169 is substantially identical, and the ambient box 169 could complete the second bank 176, the first and second banks 176-177, or could encompass a full bank.

The tower unit 121 is then installed onto the assembled lower unit 110 by mating the outlets of the product and diluent circuits 201, 202, and 103 of the lower unit 110 to the inlets 131 and 164 of the first tower unit 121. The mounting flange 221 must face towards a front of the product dispenser 100, and the apertures 223 must align with the apertures 224 disposed within the top plate 112. The mounting flange 221 is secured to the top plate 112 with fasteners. Similarly, the apertures 223 of the second mounting flange 222 are aligned with the restraint apertures 224 of the top plate 112, and second mounting flange 222 is restrained.

The second tower unit 122 is then installed in similar fashion to the first tower unit 121, wherein the inlets 261 and 263 of the tower unit 122 are mated with the outlets 180 and 242 of the lower unit 110. The apertures 223 of the first and second mounting flanges 221-222 of the second tower unit 122 are also aligned with apertures 224 disposed in the top plate 112, and the second tower unit 122 is secured to the top plate 112.

In this particular example, the third tower unit 123 is installed between the first and second tower units 121-122, and therefore does not have a second mounting flange. The third tower unit 123 is inserted in similar fashion to the first and second tower units 121-122, whereby the outlets 211 of the product lines disposed within the ambient box 169 mate with the inlets 252 and 254 of the third tower units 123 to extend the ambient product circuits to the outlets 253 and 255 of the third tower unit 123. Accordingly, ambient products passing through the ambient box 169 are delivered to the product circuits of the third tower unit 123. The apertures 223 disposed in the mounting flange 221 are aligned with the securing apertures 224 disposed within the top plate 112, and the third tower unit 123 is restrained with fasteners.

The tower units 121-123 may also include a securing tab 233 or a securing aperture 234 for interconnection. Illustratively, in this particular example, the first tower unit 121 and the second tower unit 122 each include at least one securing tab 233 including an aperture, and the third tower unit 123 includes at least one securing aperture 234 for each adjacent tower unit. The securing apertures 234 are disposed in a location complementary to the apertures of the securing tabs 233 when the tower units are adjacent to each other, whereby a fastener passes through the aperture of the securing tab 233 and secures to the securing aperture 234.

After the securing of the mounting flange 221 of the third tower unit 123 and interconnecting the tower units 121-123 together, the back support bracket 124 may be installed about the tower units 121-123 by orienting the planar portion 227 adjacent to the rear faces of the tower units 121-123, aligning the legs 228 adjacent to the side walls of the tower units 121-123, and orienting the flanges 229 at a lowest position. Once properly aligned, the apertures 230 will be in alignment with the apertures 223 of the second mounting flanges 222, and the planar portion 227 rests on the rear flanges 225 of the tower units 121-123. The back support bracket 124 is secured to the second mounting flanges 222 and the top plate 112 through the apertures 230. Once properly secured, the back support bracket 124 restrains the rear flanges 225, and the second mounting flanges 222. Upon proper alignment of the tower units 121-123, the faucet plate and the dispense points 105 may be mounted to the installed tower units 121-123, thereby extending the product and diluent circuits to the dispense points 105.

The assembly continues with the installation of the tower structure 125. The first and second vertical supports 147-148 are then aligned, such that the apertures 189 in the first flange 185 align with securing apertures 237 disposed within the top plate 112. In this particular example, the first and second vertical supports 147-148 are disposed such that flanges 185-188 extend toward each other, and the crossbar 149 is then secured to the first and second vertical supports 147-148, thereby providing a rigid secure structure. Next, the outer skin 150 is placed over the vertical supports 147-148, such that the mounting flange 182 is disposed over the fourth mounting flange 188 of the first vertical support 147, and the mounting flange 183 overlays the fourth mounting flanges 188 of the second vertical support 148. The apertures 184 of the mounting flanges 182-183 must align with the apertures 190 of the fourth flanges 188. Once aligned fasteners are inserted to restrain the outer skin 150 to the first and second vertical supports 147-148.

The cap 151 is then installed onto the vertical supports 147-148, such that the flanges 196-199 extend downward and the apertures 194 align with the apertures 191 of the vertical supports 147-148. Once aligned, fasteners are inserted to secure the outer skin 150 and the cap 151 to the vertical supports 147-148. The drip tray and splash plate may then be installed. In this manner, the outer structure 125 provides a clean, closed out tower, wherein the restraint of the tower structure 125 is independent of the restraint of the tower units 121-123.

In use, the product dispenser 100 delivers chilled concentrate and diluent from the product circuits that pass through the cold plate 107 or ambient fluids that pass through the ambient box 169. Product concentrate originates at a product concentrate source, enters at least one concentrate line 142, moves through the concentrate line 142 as it passes through the cold plate 107, exits the cold plate 107 and moves up to the outlet 174. The concentrate then enters the inlet 131 of the product line 130 disposed within the first tower unit 121, moves through the first tower unit 121, and exits the outlet 132. The concentrate then enters the inlet 106 of the dispense point 105, and exits the dispense point 105 upon a dispense command.

A diluent from a diluent source enters the diluent inlet 171 of the diluent line 141, moves through the diluent line 141 as it passes through the cold plate 107, exits the cold plate 107, and extends upward to the outlet 172. As the diluent line 141 passes through the product line aperture 143, the outlet 172 is positioned above the top plate 112. The diluent then enters the inlet 164 of the diluent line 163, and moves through the first tower unit 121 to the outlet 165. As the diluent inlet 104 is in fluid communication with the outlet 165, the diluent enters the dispense point 105 and is ready for dispensing operations.

An ambient product circuit 109 originates at an ambient product source. An ambient product enters the product dispenser 100 through the inlet 210 of the ambient product line 207 disposed in the ambient box 169, moves through the ambient product line 207 to the outlet 211, and enters the inlet 252 of the third tower unit 123. Once in the third tower unit 123, the ambient product moves through the first ambient product line 250 to the ambient outlet 253. The ambient product then enters one of the inlets 106 or 104 for the dispense point 105 for delivery alone, with a diluent, or mixed with a concentrate. One of ordinary skill in the art will recognize that the ambient product may be a concentrate, a diluent, or a single strength fluid. As such, many combinations are available, and are considered within the scope of this invention.

Upon a dispense command, the diluent, concentrate, ambient product, or combinations thereof, is delivered from the dispense point 105. Accordingly, a user may place a drink receptacle below a particular flavor dispense point 105, activate a dispense button, dispense a particular flavor drink, and retrieve the receptacle for consumption.

The tower structure 125, or portions thereof, may be removed from product dispenser 100 without removing the tower units 121-123. Illustratively, the cap 151 and the outer skin 150 may be removed for signage purposes, cleaning, or replacement. The ability to remove the outer skin 150 and the cap 151 without breaking the product and diluent circuits 201, 202, 103, and 109, is a great advantage to operators, as product sales are not affected.

In use, the tower units 121-123 are secured to the top plate 112 with fasteners passing through the mounting flanges 221 and 222, the back support bracket 124, and the interconnection between adjacent tower units. The mounting flanges 221-222 are secured to the top plate 112. The back support bracket 124 holds the rear portions of the tower units 121-123 and the second mounting flanges 222 down, thereby providing an evenly distributed restraint system. The interconnection fasteners passing through the securing tabs 233 allow the tower units 121-123 to be aligned and secured in place. The tower units 121-123 are in fluid communication with the product circuits 201, 202, and 109, of the lower unit 110 and the ambient box 169, and accordingly, the product circuits 201, 202, 103, and 109, are extended or shortened when a tower unit is removed. The tower units 121-123 may be removed independently for service, replacement, or the like, by removing the fasteners holding the back support bracket 124, the fasteners disposed in the mounting flanges 221-222, and the interconnection fasteners. Alternatively, the product dispenser 100 may be outfitted with only two tower units, whereby one of the tower units delivers ambient products. One of ordinary skill in the art will recognize that the design of the tower units 121-123 is complementary to even a single tower unit.

The ambient box 169 may be removed or replaced with an ambient box having an alternate number of ambient product lines as long as the third tower unit 123 includes a complementary number of ambient product lines. Alternatively, the ambient box 169 may be configured after the installation of the product dispenser 100, whereby the ambient product circuits 109 may be upgraded or reconfigured with seasonal products. Accordingly, the ambient box 169 provides the ability to add ambient product circuits to the product dispenser 100. One of ordinary skill in the art will recognize that the ambient box 169 may also be utilized with pre-chilled products, thereby providing another alternative use.

The lid 120 moves from a bin-closed position to a bin-open position by sliding into the cavity 143 of the lid housing 119, and from the bin-open position to the bin-closed position by moving the lid 120 out of the cavity 143 until the flange 162 engages the valve cutout switch 134. In the bin-closed position, the bin 111 is not accessible by an operator. In the bin-open position, the operator may access the contents of the bin 111. When the lid 120 is disposed in the bin-closed position, the flange 162 engages the valve cutout switch 134, the controller 133 recognizes that the lid 120 is in the bin-closed position, and activates the dispensing valves 105 when a dispense command is initiated by the operator. When the lid 120 is in the bin-open position, the flange 162 does not engage the valve cutout switch 134, and the controller 133 deactivates the product valves 105. Accordingly, operators may only dispense product when the lid 120 is in the bin-closed position.

The sliding lid 120 and the rotating lid 136 are interchangeable provided all accompanying hardware is changed out. Accordingly, the rotating lid 136 may be replaced with the sliding lid 120 by removing the fasteners securing the hinge brackets 137 to the top plate 112. Upon removal of the fasteners, the lid 120 and lid housing 119, including valve cutout switch 134, may be secured to the top plate 112 utilizing fasteners passing through restraint apertures 127. The valve cutout switch 134 may further require a wiring harness connection, thereby placing the valve cutout switch 134 in electrical communication with the controller 133.

The redirector 115 closes out a rear portion of the inlet 118 to prevent ice and water from exiting the bin 111 through the rear portion of the inlet 118. The redirector 115 is advantageous when operators scoop ice disposed within the bin 111 towards the rear of the product dispenser 100, in their attempts to fill drink receptacles. The elimination of ice and water leaving the bin 111 through the rear portion of the inlet 118 eliminates ice and partially melted ice moving down the back side of the product dispenser 100 and onto the floor, as well as any water puddles associated therewith.

The lifting tangs 135 are secured to the top plate 112 with fasteners adequate to support a lifted weight of the product dispenser 100. In use, an operator connects a lifting harness to a lifting device. Lifting points of the lifting harness are then connected to the lifting port 216 of each lifting flange 213. The lifting device then provides an upward force, thereby lifting the product dispenser 100. If adequately outfitted, the lifting device may be directed to the installation or removal point. Once properly positioned, the product dispenser 100 may be lowered, and set in place. The lifting harness may then be removed from the lifting tangs 135.

While this invention has been shown with a product dispenser including a tower formed from at least one tower unit 121, 122, or 123 and a tower structure 125, one of ordinary skill in the art will recognize that many forms of towers exist. In this invention, the term "tower" is defined as any form of product dispenser portion that protrudes from a supporting surface, such as a counter top, a table top, a dispenser housing, and the like. Accordingly, a "tower" may be formed from multiple components, multiple tower segments, or a single structure. One of ordinary skill in the art will further recognize, in this particular example, the tower structure 125 and at least one tower unit 121, 122, or 123 may be secured together to provide an integral tower.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

We claim:

1. A product dispenser, comprising:

a housing;

at least one product circuit disposed within the housing;

a bin disposed within the housing, wherein the bin includes an inlet and a storage chamber, and further wherein the storage chamber stores a product;

a redirector disposed on a rear portion of the bin, wherein the redirector prevents the product from exiting the storage chamber through the rear portion of the inlet when operators attempt to scoop product in the storage chamber;

a plate disposed atop the housing over the redirector, wherein the plate includes a port adapted to allow access to the bin;

a lid housing disposed atop the plate, wherein the lid housing includes flanges defining a cavity and adapted to prevent product from exiting the cavity;

a lid movable from a closed position over the port of the plate that blocks access to the bin to an open position disposed within the cavity of the lid housing that allows access to the bin; and a tower unit disposed on the plate and communicating with the at least one product circuit, whereby the tower unit delivers a drink from the product dispenser.

2. The product dispenser according to claim 1, wherein the tower unit and the at least one product circuit communicate through and aperture in the plate.

3. The product dispenser according to claim 1, wherein the product is ice.

* * * * *